UNITED STATES PATENT OFFICE.

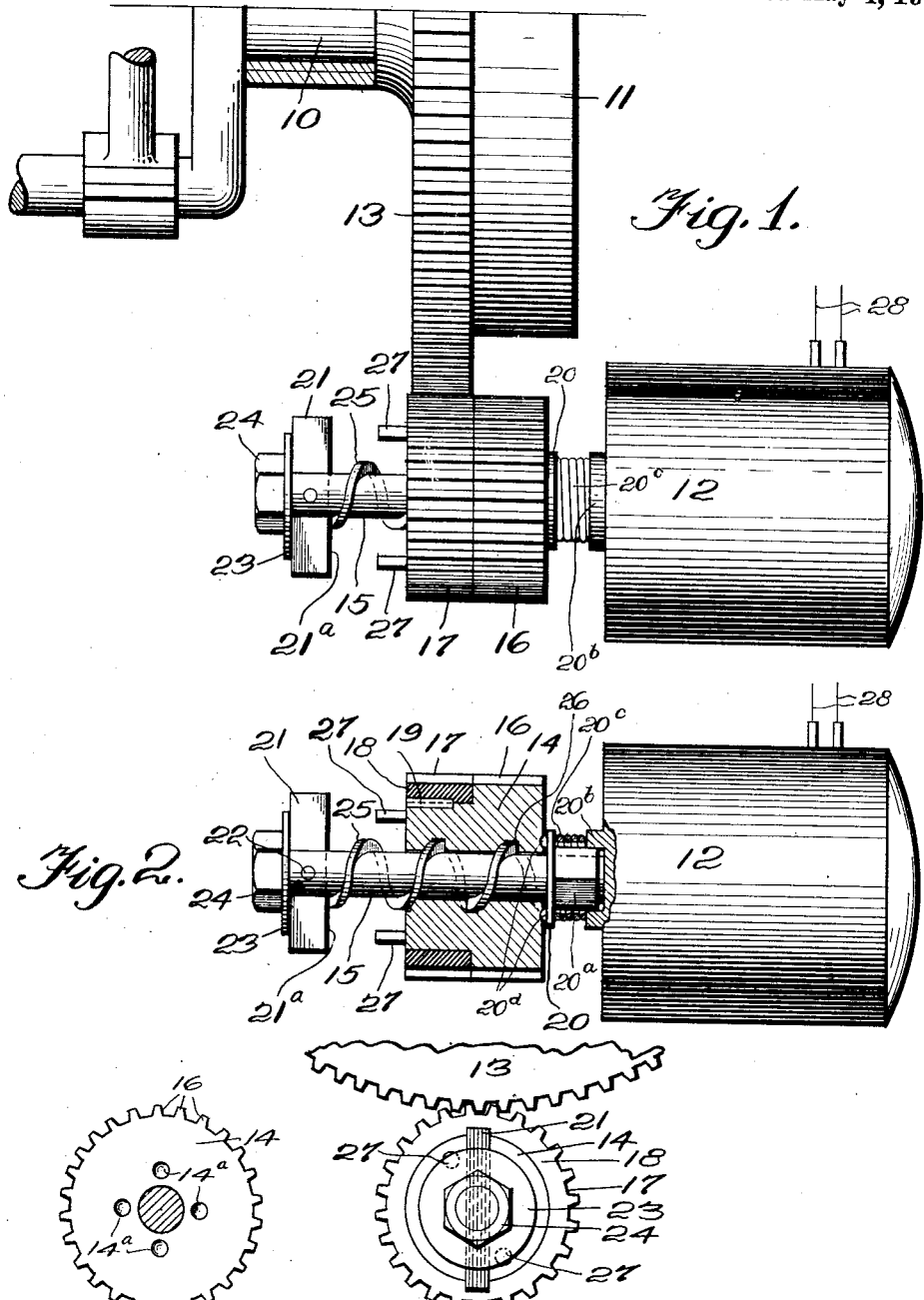

JAMES KENDALL DELANO, OF NEW YORK, N. Y.

POWER TRANSMISSION.

1,339,258.  Specification of Letters Patent.  Patented May 4, 1920.

Application filed July 21, 1917. Serial No. 182,032.

*To all whom it may concern:*

Be it known that I, JAMES K. DELANO, a citizen of the United States, residing at New York, in the county of New York and State of New York, have invented certain new and useful Improvements in Power Transmission; and I do hereby declare the following to be a full, clear, and exact description of the invention, such as will enable others skilled in the art to which it appertains to make and use the same.

This invention relates to power transmission; and more particularly, it relates to an arrangement in which two or more devices are connected by power transmission means which is required to operate at different times under different conditions of speed or the like, provision being made for varying the nature of a power-transmitting surface at an intermediate point in the transmission train in such manner as to secure the best driving effect for each condition of operation. More particularly the invention relates to a system of this character in which two motor devices are connected by transmission means in such manner that either motor device may drive the other, the driving speed and the stresses on the transmission means differing according to which motor device is driving. Still more specifically, the invention relates to a particularly advantageous application of the above broad principles to electrical systems for use on autovehicles propelled by internal combustion engines, the system comprising a dynamo electric machine capable of operating as a motor to start the engine, and of being driven by the engine as a generator after the engine has picked up and is operating normally, the transmission means being designed for strength when the dynamo electric machine drives, and for quiet running when the dynamo electric machine is being driven.

In explaining the principles of the invention, the last mentioned specific application thereof to electrical systems for autovehicles wherein a motor generator or dynamo motor is geared to the engine shaft, will be particularly referred to and described. But it is to be understood that the invention is not limited to the particular construction chosen for purposes of illustration.

In initially starting or turning over an internal combustion engine from a condition of rest, a relatively large starting torque is required and consequently the gearing included in the transmission mechanism connecting the dynamo electric machine with the engine must have a strength amply sufficient to withstand the stresses involved without breakage or injury. In practice it is therefore necessary that the gears engaged during the starting period shall be of metal, preferably steel, in order to give the necessary strength and durability. But the driving torque involved when the dynamo electric machine has ceased to operate as a motor and is being driven as a generator is very much less, and consequently the stresses in the transmission gearing are correspondingly lower. Under the conditions of operation, gearing of much less strength than is required in starting would suffice, but heretofore no advantage has been taken of this fact.

An objectionable feature of systems of the character described has been the constant noise due to the operation of the metal transmission gears when the engine is driving the dynamo electric machine as a generator, the condition obtaining, of course, during the normal running of an autovehicle thus equipped. This objection is especially noticeable in a system which employs no speed reduction gearing between the engine and the dynamo electric machine, but depends on the character of the machine windings or some other current and voltage regulating means to control the current output and thus to prevent injury to the armature and excessive flow of current to the storage battery; for the speed at which the armature of the dynamo electric machine rotates is very much greater when it is being driven as a generator than when it operates as a motor in cranking the engine. It has not been feasible, however, to eliminate or reduce the noise by substituting quiet running gearing, such as non-metallic gearing, for any part of the transmission train, owing to the fact that in practice such gearing would not stand up under the stresses involved in the heavy starting torque.

It is a principal object of the present invention to eliminate the greater part of the objectionable noise heretofore inherent in systems of the character above described by utilizing as a part of the transmission train, gear surfaces adapted, respectively, for strength and for quiet running, said gear surfaces being arranged to be brought into action alternatively, according as the dynamo electric machine drives or is driven.

A system embodying the principles of the invention is illustrated more or less diagrammatically, in the accompanying drawings in which—

Figure 1 is a view in elevation showing a practical method of gearing a motor generator to the crank shaft of an internal combustion engine, in accordance with the invention;

Fig. 2 is a detail view, partly in elevation and partly in section, further illustrating the gearing constructions;

Fig. 3 is a partial end view of the gear connection shown in Fig. 1, and

Fig. 4 is a view of the opposite end of the shiftable pinion.

Referring to the form of the invention illustrated in the drawings, 10 designates the crank shaft of an internal combustion engine having a flywheel 11; and 12 is a dynamo electric machine, in this instance a motor generator or dynamo motor, which is constantly geared to the engine crank shaft through suitable transmission means in such manner that the dynamo electric machine may function as a motor in starting the engine, and may subsequently be driven by the engine as a generator. In the present example, the gear ratio between the engine and the motor generator is fixed, the driving connection comprising a circular rack or gear 13 on the flywheel, and a pinion 14, mounted on an extension 15 of the armature shaft of the motor generator. The pinion 14 is provided with two types of power transmitting surfaces which are indicated at 16 and 17, surface 16 being adapted for heavy torque transmission, while surface 17 is adapted to transmit only lighter torque but to operate more quietly. Both these surfaces are here shown as comprising spur teeth which are adapted to mesh with the teeth of gear 13 on the engine flywheel, and which are also arranged in accurate longitudinal registry with each other. The teeth 16, however, are of metal, being formed in this instance integral with the body of the pinion 14, which may be of steel, for example. Teeth 17, on the other hand, are of softer material, most desirably non-metallic, such as raw hide or other suitable material preferably fibrous in character. This relatively quiet running gear surface may of course be composed of a softer or less resonant metal or alloy than steel; or it may consist of alternating metal and fiber laminations. The teeth 17 are formed on an annulus 18 which may be secured in any suitable manner with the pinion 14 being keyed thereto at 19 in the present example. It is evident that transmission may be effected either through the metal gear teeth 16 or non-metallic gear teeth 17, alternatively, by shifting the pinion 14 longitudinally on the shaft 15, the latter being of sufficient length to permit such movement of the pinion. Movement of the pinion 14 in one direction, to the right in the drawing, may be limited by suitable cushioning means. Such means may take any convenient form, and comprises in this instance a collar 20 carried on an externally squared hub or sleeve 20$^a$ which is slidable on the armature shaft but whose end always lies within a squared recess in the hub 20$^b$ on the armature shaft, the recess being of sufficient depth to permit the necessary longitudinal movement of the collar along the shaft. A compression spring 20$^c$ is coiled around the sleeve 20$^a$, being secured thereto and to the hub 20$^b$ in any suitable manner. Movement of the pinion in the opposite direction is limited by cushioning means here shown as comprising a compound leaf spring device 21, pinned to the shaft 15 at 22, and further held against displacement by washer 23 and retaining nut 24.

Suitable means should be provided to move the pinion 14 along the shaft to bring either the gear 16 or the gear 17 into mesh with gear 13, according to the character of the driving conditions. Most advantageously such means should operate automatically and in such manner as to place the metallic gear 16 in mesh when the dynamo electric machine operates as a motor in starting the engine, and then to place the non-metallic gear 17 in mesh after the engine has speeded up and is driving the dynamo electric machine as a generator. One means of accomplishing this result which has proved satisfactory in practice is shown in Figs. 1 and 2 where the pinion has a spiral or screw thread connection to the shaft 15. As here shown, the shaft carries a spiral rib or thread 25 of relatively steep pitch, while the central bore of the pinion is provided with a complementary spiral groove 26 engaged by the spiral rib. Relative rotational movement between the pinion and the shaft in one direction causes the pinion to move outwardly along the shaft, that is, toward the left in the drawing; while relative rotational movement in the opposite direction causes the pinion to move toward the right. Only when the pinion is in either one of its extreme limiting positions is there power-transmitting connection between the pinion and the shaft of such character as to transmit power to or from the gear 13.

For a purpose to be hereinafter explained, the pinion 14, in the present instance, is provided on its outer face with pins 27; and the location of these pins, together with the arrangement and pitch of the spiral 25, is such that when the pinion 14 is moved outwardly along this shaft, said pins 27 engage the flat sides of the leaf spring member 21 near its opposite ends shortly before the pinion reaches its outward limit of travel, further relative rotational movement between the pinion and the shaft under the conditions assumed being opposed by the resiliency of the rather stiff spring.

It is to be understood that the motor generator is connected by suitable mains as at 28 to a storage battery floating across the line, and that a suitable current controlling and cut-out system may also be provided, such details being however well known in the art and not requiring specific illustration here. The external current regulating system may of course be dispensed with if the windings of the motor generator are of such character as to provide the necessary current regulation.

Assuming the system to be at rest, with the parts in the position shown in the drawings where the non-metallic gear 17 is meshed with the gear 13 on the engine flywheel, and assuming that it is desired to start the engine, current is supplied to the motor generator from the battery by operating suitable switch means, and the armature begins to rotate. The direction of rotation is such that the pinion moves outwardly along the shaft 15, or toward the left in the drawings. Under these conditions the pinion 14 is held against rotation with shaft 15 by engagement of the pinion with the gear 13, no power being transmitted to the gear 13 until the pinion has run out to its extreme position at the left. As the pinion moves toward the left, the non-metallic gear 17 is moved out of engagement with the gear 13, while the gear 16 slides into mesh with gear 13. Just after gear 17 is fully disengaged, the projecting pins 27 are struck by the ends of the compound leaf spring member 21, which yields until the power thus stored up in the spring is sufficient to overcome the resistance of the flywheel. By this time the motor generator has speeded up and attained considerable momentum so that at this instant there is transmitted to the gear 13 through the metallic gear 16 of the pinion not only the full operating torque of the motor, but also the force due to the attained momentum. Furthermore, the power stored up in the stressed leaf spring member 21 is also available, this force being applied to pinion 14 in such manner as to tend to unscrew it and move it back slightly along the shaft toward the motor. It is to be noted that this stored force of the spring device is applied with great mechanical advantage, the slight turning of the pinion on the inclined spiral giving a high leverage. The combined forces thus brought into play at the instant of starting result in a heavy torque on the engine crank shaft when it is most needed, thus giving certainty and efficiency in operation.

As soon as the engine has picked up and has attained a speed at which it causes the pinion 14 to overrun the armature shaft 15, the pinion runs back on the shaft into its limiting position at the right against the cushioning collar 20, thus disengaging the metal gear 16 and bringing the non-metallic gear 17 into mesh with gear 13. As soon as this occurs, driving connection is again established between the engine shaft and the armature shaft, but now the engine drives the armature and the dynamo electric machine operates as a generator to charge the accumulator. Under these conditions of relatively low torque and high speed operation, the rawhide or other quiet running gear 17 is amply strong and durable to serve as an element in the transmission train, and at the same time the objectionable noisy operation of a metallic gear connection is eliminated.

Yielding stop or detent means may also be provided to hold the pinion in generating position, regardless of fluctuations in the engine speed. For example, the outer face of collar 20 may carry one or more rounded projections $20^d$ adapted to engage rounded recesses $14^a$ in the adjacent face of the pinion. If the engine speed falls slightly and the generator tends by its own momentum to overrun the pinion and thus cause the pinion to run out along the shaft, this is prevented by the spring-pressed engagement of the projections in the recess $14^a$. But this engagement yields readily to release the pinion from generating position when the motor generator operates as a motor.

While the specific embodiment of the invention here illustrated involves the use of a pinion presenting separate power transmitting surfaces of different characteristics, so combined as to constitute a substantially unitary construction, and while such construction has special advantages for the purposes in view, the invention in its broader aspects is not limited to this particular arrangement but is to be construed as contemplating all such structural variations and applications of the broad principles involved as properly fall within the definitions set forth in the accompanying claims.

Considered as a starting unit to be placed on the market as such, the motor generator with its compound or duplex gear connection is novel, entirely apart from its combination with an engine crank shaft. The embodiment of two power transmitting surfaces of different characteristics as herein described, combined in a substantially unitary construction, and particularly when combined in the specific pinion construction herein disclosed, also forms an important feature of the invention, in and of itself. Spiral or other suitable form of gearing may of course be employed instead of the spur gearing showing in the drawings.

What I claim is:

1. The combination, with two motor devices, of transmission means connecting said device, in such manner that either may drive the other, said transmission means comprising shiftable power-transmitting means having surfaces adapted, respectively, for strength and for quiet operation, and means whereby one or the other of said surfaces may be shifted into action alternatively, according to which motor device is driving.

2. The combination, with two motor devices, of transmission means connecting said devices in such manner that either may drive the other, said transmission means comprising a metallic gear and a non-metallic gear, and means whereby either one or the other gear is brought into action automatically according to which motor device is driving.

3. The combination, with two motor devices, of transmission means connecting said devices in such manner that either may drive the other, said transmission means including a rotatable shaft, and a transmission member carried by said shaft and constantly engaging another member of said transmission means and automatically shiftable along said shaft into different positions dependent upon which motor device is driving.

4. The combination, with two motor devices, of transmission means connecting said devices in such manner that either may drive the other, said transmission means including a rotatable shaft, and a transmission member carried by said shaft and automatically shiftable along said shaft into different positions dependent upon which motor device is driving, said transmission member having working surfaces of different materials which are selectively brought into action as the transmission member is shifted.

5. The combination, with two motor devices, of transmission means connecting said devices in such manner that either may drive the other, said transmission means comprising a gear member whose working surface has sections composed of different materials said gear member being automatically movable to bring a predetermined section into action according to which motor device is driving.

6. The combination, with a power device, of transmission means operatively associated therewith and shiftable into different power-transmitting positions to provide for different operating conditions, said transmission means comprising different power-transmitting surfaces adapted, respectively, for strength and for quiet operation, said surfaces being arranged to be brought into action alternatively according to the position occupied by said transmission means.

7. The combination, with a source of power, of transmission means operatively associated therewith, said transmission means comprising metallic and non-metallic driving elements arranged to serve alternatively depending upon the driving conditions.

8. Engine starting apparatus comprising the combination, with a motor generator having its armature shaft extended, of transmission means mounted on said shaft and movable lengthwise thereof, into different driving positions, a spiral connection between said means and said shaft operable to effect such movement, and cushioning means limiting movement of said transmission means in both directions.

9. Engine starting apparatus comprising the combination, with a motor generator having its armature shaft extended, of transmission means mounted on said shaft and movable lengthwise thereof into different driving positions for motor operation and generator operation, respectively, means operable to effect such movement, and means for yieldably holding said transmission means in position for generator operation.

10. Engine starting apparatus comprising the combination, with a motor generator having its armature shaft extended, of transmission means mounted on said shaft and movable lengthwise thereof into different driving positions, said transmission means comprising a metallic gear and a non-metallic gear, and means for shifting the transmission means along the shaft to bring either gear into action automatically according to the direction of drive through the transmission means.

11. Engine starting apparatus comprising the combination with an internal combustion engine and a gear having a driving connection to the engine shaft, of a motor generator, a shaft in driving relation thereto, and a pinion shiftable along said shaft into different driving positions but constantly in mesh with said gear.

12. Engine starting apparatus comprising the combination with an internal combustion engine and a gear having a driving connection to the engine shaft, of a motor generator having an extension of its shaft, said extension being provided with a steep pitch screw thread or spiral rib, a pinion carried by said extension and internally grooved to work on said screw thread, said pinion being movable by rotation of the shaft extension relatively to said pinion into either of two driving positions, said pinion being provided with two parallel sets of teeth designed for strength and for quiet operation, respectively, and one or the other of said sets coming into action according to the position of the pinion.

13. Engine starting apparatus comprising the combination, with a gear connected to the engine crank shaft, of a motor generator having a suitable shaft, and gear means on the motor generator shaft and movable lengthwise thereof into different driving positions according as the motor generator drives or is driven, said gear means remaining in mesh with said gear at all times.

14. Engine starting apparatus comprising the combination, with a gear connected to the engine crank shaft, of a motor generator having a suitable shaft, a pinion mounted on the motor generator shaft and shiftable lengthwise thereof into two driving positions, said pinion being loose on the shaft when intermediate said positions but in mesh with said gear at all times, and means operable automatically to shift said pinion into one or the other of said driving positions according as the motor generator drives or is driven.

15. Engine starting apparatus comprising the combination, with a gear operatively connected with the engine crank shaft, of a motor generator having an extended shaft, a pinion mounted on the shaft extension and arranged to mesh with said gear, said pinion having two sets of teeth of different materials and being shiftable along said shaft into driving position to engage either set of teeth with said gear according as the motor generator drives or is driven, and a screw connection between the pinion and the motor generator shaft whereby such shift is automatically effected.

16. Engine starting apparatus comprising the combination, with a gear operatively connected with the engine crank shaft, of a motor having a suitable shaft, a pinion mounted on said shaft and having a spiral connection thereto whereby said pinion may be moved lengthwise of the shaft into a limiting position, said pinion being always in mesh with said gear, and resilient means fixed on said shaft and adapted to be engaged and placed under stress by said pinion before the pinion reaches such limiting position.

17. The combination, with a source of power, of shiftable transmission means operatively associated therewith, said means comprising two power-transmitting surfaces of which one is adapted to transmit relatively high torque, while the other is adapted to transmit lower torque but to run more quietly at high speeds, and means whereby said transmission means may be shifted to effect transmission through either power-transmitting surface alternatively.

18. The combination, with a source of power, of transmission gearing connected thereto, said gearing having two gear surfaces of which one is metallic and the other non-metallic, and means whereby transmission may be effected through either one of said surfaces alternatively.

19. The combination, with a dynamo electric machine having a suitable armature shaft, of transmission means mounted on the shaft and comprising a metallic gear and a non-metallic gear.

20. The combination, with a dynamo electric machine having a suitable armature shaft, of a pinion mounted on said shaft and comprising two sets of teeth designed, respectively, for strength and for quiet running.

21. The combination, with a motor generator having a suitable armature shaft, of a pinion mounted on said shaft and having a spiral connection thereto for movement longitudinally thereof, said pinion comprising a metallic gear surface and another gear surface adapted for more quiet operation.

22. As a new mechanical element, a substantially unitary gear device comprising alternatively engageable power-transmitting surfaces of different materials, for the purposes set forth.

23. As a new mechanical element, a pinion having two sets of teeth of different materials on its working face.

24. As a new mechanical element, a pinion having a series of metallic teeth and a series of non-metallic teeth adjacent thereto and in registry therewith.

25. An engine starting apparatus comprising the combination of a motor having a suitable shaft, a pinion mounted on said shaft, means connecting the pinion and the shaft whereby the pinion is movable longitudinally of the shaft and rotatable therewith, a leaf spring secured to and projecting radially from the shaft, and means carried by the pinion for engaging said spring near its free end.

26. An engine starting apparatus comprising the combination of a motor having a suitable shaft, a pinion mounted on said shaft, means connecting the pinion and the shaft whereby the pinion is movable longitudinally of the shaft and rotatable therewith, a leaf spring secured to and projecting radially from opposite sides of said shaft, and means carried by the pinion for engaging said spring near its free ends.

27. The combination with two motor devices, of transmission means connecting said devices in such manner that either may drive the other, said transmission means comprising means having toothed power-transmitting surfaces adapted, respectively, for strength and quiet operation, the arrangement being such that one or the other of said surfaces may be brought into action alternatively, according to which motor device is driving.

28. A unitary gear having two distinct working surfaces of substantially the same diameter, one of said surfaces being of relatively greater mechanical strength than the other.

29. A unitary toothed gear having two distinct peripheral working portions of the same diameter, one of said toothed portions being of relatively greater mechanical strength than the other.

In testimony whereof I hereunto affix my signature.

JAMES KENDALL DELANO.